(12) United States Patent
Sun et al.

(10) Patent No.: US 11,595,743 B2
(45) Date of Patent: Feb. 28, 2023

(54) METHODS, DEVICES, APPARATUSES AND COMPUTER STORAGE MEDIA FOR TRANSMISSION OF A TIME SYNCHRONIZATION MESSAGE

(71) Applicant: Nokia Technologies Oy, Espoo (FI)

(72) Inventors: Lifei Sun, Shanghai (CN); Jiabao Zou, Shanghai (CN); Shenping Guo, Shanghai (CN); Dan Geng, Shanghai (CN); Jian Li, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/036,507

(22) Filed: Sep. 29, 2020

(65) Prior Publication Data

US 2021/0099777 A1    Apr. 1, 2021

(30) Foreign Application Priority Data

Sep. 30, 2019 (CN) .......................... 201910944797.3

(51) Int. Cl.
   *H04Q 11/00*   (2006.01)

(52) U.S. Cl.
   CPC ..... *H04Q 11/0067* (2013.01); *H04Q 11/0066* (2013.01); *H04Q 2011/0079* (2013.01); *H04Q 2011/0088* (2013.01); *H04Q 2213/1336* (2013.01)

(58) Field of Classification Search
   None
   See application file for complete search history.

(56) References Cited

U.S. PATENT DOCUMENTS

| | | | | |
|---|---|---|---|---|
| 2010/0040369 | A1* | 2/2010 | Zhao .................. | H04Q 11/0067 398/58 |
| 2010/0098433 | A1* | 4/2010 | Boyd ................. | H04Q 11/0067 398/155 |
| 2010/0158527 | A1* | 6/2010 | Mizutani ............. | H04J 14/0258 375/E1.003 |
| 2012/0027414 | A1* | 2/2012 | Wei ...................... | H04J 3/0655 398/100 |

OTHER PUBLICATIONS

International Telecommunication Union, ITU-T G.8273.2, "Series G: Transmission Systems and Media, Digital Systems and Networks", Aug. 2019, 56 pgs.

* cited by examiner

Primary Examiner — Jamaal Henson
(74) Attorney, Agent, or Firm — Harrington & Smith (57) ABSTRACT

Embodiments of the present disclosure relate to methods, optical line terminals (OLTs), optical network units (ONUs), apparatuses and computer storage media for transmitting a time synchronization message. In some example embodiments, the OLT is configured to: determine a threshold rate to be N messages per second for transmission of a time synchronization message to an ONU, wherein N being greater than or equal to 0.1; and transmit, to the ONU, a time synchronization message at the threshold rate or a rate above the threshold rate, to enable the ONU to perform time synchronization with the OLT. In some other example embodiments, the OLT is configured to: select a plurality of ONUs for transmitting time synchronization information; and transmit, to the ONUs, a broadcast or multicast message the time synchronization information, to enable the plurality of ONUs to perform time synchronization with the OLT.

15 Claims, 7 Drawing Sheets

METHODS, DEVICES, APPARATUSES AND COMPUTER STORAGE MEDIA FOR TRANSMISSION OF A TIME SYNCHRONIZATION MESSAGE

FIELD

Embodiments of the present disclosure generally relate to communication technologies, and in particular, to methods, devices, apparatuses and computer storage media for transmission of a time synchronization message.

BACKGROUND

In various passive optical networks (PONs), such as an Ethernet Passive Optical Network (EPON), a Gigabit Passive Optical Network (GPON) and the like, for example, the xPON, the optical line terminal (OLT) and the optical network unit (ONU), acting as a pair of cascaded media converters, are a part of chains of the Telecom Boundary Clock (T-BC) and are used to achieve time synchronization in xPON. G.8273.2 defines performance requirements of the OLT and the ONU as TBC cascaded media converters, including performance requirements related to noise transfer. Also, the transfer of time error from a Precision Time Protocol (PTP) input interface to the PTP output interface and 1 pulse per second (1PPS) output interface, and the transfer of phase shift from a physical layer interface to the PTP output interface and the 1PPS output interface are included.

The OLT and the ONU may work as a distributed T-BC synchronization device, or the equivalent of two T-BC synchronization devices. Existing standards related to the xPON (e.g., G.984.3 amd2, G.9807.1, G.989.3, etc.) only specify the frequency and phase transfer manner from the OLT to the ONU, but do not involve how to meet the noise transfer performance between the OLT and the ONU.

SUMMARY

In general, example embodiments of the present disclosure provide methods, OLTs, ONUs, apparatuses and computer storage media for transmission of a time synchronization message.

In a first aspect, the example embodiments of the present disclosure provide an optical line terminal. The optical line terminal comprises at least one processor and at least one memory having computer program codes stored thereon. The at least one memory and the computer program codes are configured to, with the at least one processor, cause the optical line terminal to: determine a threshold rate to be N messages per second for transmission of a time synchronization message to an optical network unit, N being greater than or equal to 0.1. The optical line terminal is further caused to: transmit, to the optical network unit, the time synchronization message at the threshold rate or a rate above the threshold rate, to enable the optical network unit to perform time synchronization with the optical line terminal.

In a second aspect, the example embodiments of the present disclosure provide an optical network unit. The optical network unit comprises at least one processor and at least one memory having computer program codes stored thereon. The at least one memory and the computer program codes are configured to, with the at least one processor, cause the optical network unit to: receive, from an optical line terminal, a time synchronization message at a threshold rate or a rate above the threshold rate, the threshold rate being N messages per second, N being greater than or equal to 0.1. The optical line terminal is further caused to: perform time synchronization with the optical line terminal based on the time synchronization message.

In a third aspect, the example embodiments of the present disclosure provide an optical line terminal. The optical line terminal comprises at least one processor and at least one memory having computer program codes stored thereon. The at least one memory and the computer program codes are configured to, with the at least one processor, cause the optical line terminal to: select a plurality of optical network units for transmitting time synchronization information. The optical line terminal is further caused to transmit, to the plurality of optical network units, a broadcast or multicast message comprising the time synchronization information, to enable the plurality of optical network units to perform time synchronization with the optical line terminal.

In a fourth aspect, the example embodiments of the present disclosure provide an optical network unit. The optical network unit comprises at least one processor and at least one memory having computer program codes stored thereon. The at least one memory and the computer program codes are configured to, with the at least one processor, cause the optical network unit to: receive, from an optical line terminal, a broadcast or multicast message comprising time synchronization information, and perform time synchronization with the optical line terminal based on the time synchronization information.

In a fifth aspect, the example embodiments of the present disclosure provide a method implemented at an optical line terminal. In the method, the optical line terminal determines a threshold rate to be N messages per second for transmission of a time synchronization message to an optical network unit, N being greater than or equal to 0.1. The optical line terminal transmits, to the optical network unit, the time synchronization message at the threshold rate or a rate above the threshold rate, to enable the optical network unit to perform time synchronization with the optical line terminal.

In a sixth aspect, the example embodiments of the present disclosure provide a method implemented at an optical network unit. In the method, the optical network unit receives, from an optical line terminal, a time synchronization message at a threshold rate or a rate above the threshold rate, the threshold rate being N messages per second, N being greater than or equal to 0.1. The optical network unit performs time synchronization with the optical line terminal based on the time synchronization message.

In a seventh aspect, the example embodiments of the present disclosure provide a method implemented at an optical line terminal. In the method, the optical line terminal selects a plurality of optical network units for transmitting time synchronization information. The optical line terminal transmits, to the plurality of optical network units, a broadcast or multicast message comprising the time synchronization information, to enable the plurality of optical network units to perform time synchronization with the optical line terminal.

In an eighth aspect, the example embodiments of the present disclosure provide a method implemented at an optical network unit. In the method, the optical network unit receives, from an optical line terminal, a broadcast or multicast message comprising time synchronization information, and performs time synchronization with the optical line terminal based on the time synchronization information.

In a ninth aspect, the example embodiments of the present disclosure provide an apparatus. The apparatus comprises means for performing the method according to the fifth, sixth, seventh or eighth aspect.

In a tenth aspect, the embodiments of the present disclosure provide a computer-readable storage medium having a computer program stored thereon. The computer program comprises instructions, when executed by a processor on a device, that cause the device to perform the method according to the fifth, sixth, seventh or eighth aspect.

It should be understood that the content described in the summary section is not intended to identify key or essential features of the present disclosure, nor is it intended to limit the scope of the present disclosure. Other features of the present disclosure will become easily understood through the following description.

BRIEF DESCRIPTION OF THE DRAWINGS

The above and other features, advantages and objects of example embodiments of the present disclosure will become more apparent from the following detailed description with reference to the accompanying drawings, in which the same reference numbers refer to identical or similar elements.

DETAILED DESCRIPTION OF EMBODIMENTS

The example embodiments of the present disclosure will be described in more detail below with reference to the drawings. Although the drawings illustrate some embodiments of the present disclosure, it should be appreciated that the present disclosure can be implemented in various manners and is not intended to be limited to the embodiments explained herein. On the contrary, the drawings and embodiments are provided to make the present disclosure more thorough and complete, but not to limit the scope of the present disclosure.

As used herein, the term "optical line terminal" or "OLT" refers to a device that serves as a service provider node for end-users in an optical network. The OLT may, for example, provide an electrical-optical conversion function for converting the optical signal of the user terminal into the electrical signal of a device used by the network operator. The OLT may also coordinate multiplexing between the ONUs.

As used herein, the term "optical network unit" or "ONU" refers to a client node connected to the OLT via an optical fiber to receive user data from the OLT.

The term "circuit" as used herein refers to one or more of the following:

(a) Only hardware circuit implementation (such as only analog and/or digital circuit implementation); and (b) a combination of hardware circuits and software, such as (if applicable): (i) a combination of analog and/or digital hardware circuits and software/firmware, and (ii) any part of a hardware processor and software (comprising digital signal processors, software, and memory that work together to make devices such as OLTs or other computing devices perform various functions); and (c) hardware circuits and/or processors, such as microprocessors or parts of microprocessors, which require software (for example, firmware) for operation, but there may be no software when software is not required for operation.

The definition of the circuit applies to all scenarios thereof in this application (comprising any claim). As another example, the term "circuit" used herein also covers only a hardware circuit or a processor (or multiple processors), or a part of a hardware circuit or a processor, or an implementation of software or firmware accompanying thereof. For example, if applicable to specific claim elements, the term "circuitry" also covers baseband integrated circuits or processor integrated circuits or similar integrated circuits in the OLT or other computing devices.

As used herein, the term "include" and its variants are to be read as open-ended terms that mean "includes, but is not limited to." The term "based on" is to be read as "based at least in part on." The terms "one example embodiment" and "one embodiment" are to be read as "at least one example embodiment." The term "another embodiment" is to be read as "at least one other embodiment." Related definitions of other terms will be given in the following text.

As used herein, the terms "first", "second" and so on may refer to describe various elements, and these elements should not be limited by these terms. These terms are only used to distinguish one element from another. For example, without departing from the scope of example embodiments, a first element may be referred to as a second element, and similarly, the second element may be referred to as the first element. As used herein, the term "and/or" includes any and all combinations of one or more of the listed items.

According to International Telecom Union Telecommunication Standardization Sector (ITU-T) time synchronization standard (e.g., G.8271.1 standard), the OLT and the ONU in the xPON, as a part of the TBC chain, is regarded as equivalent to two T-BC synchronization devices. For example, the OLT and the ONU typically need the frequency and phase transfer to achieve synchronization in the xPON. The frequency and phase transfer process at the OLT and the ONU is described below with reference to FIGS. 1(a) and 1(b).

Figure 1A:
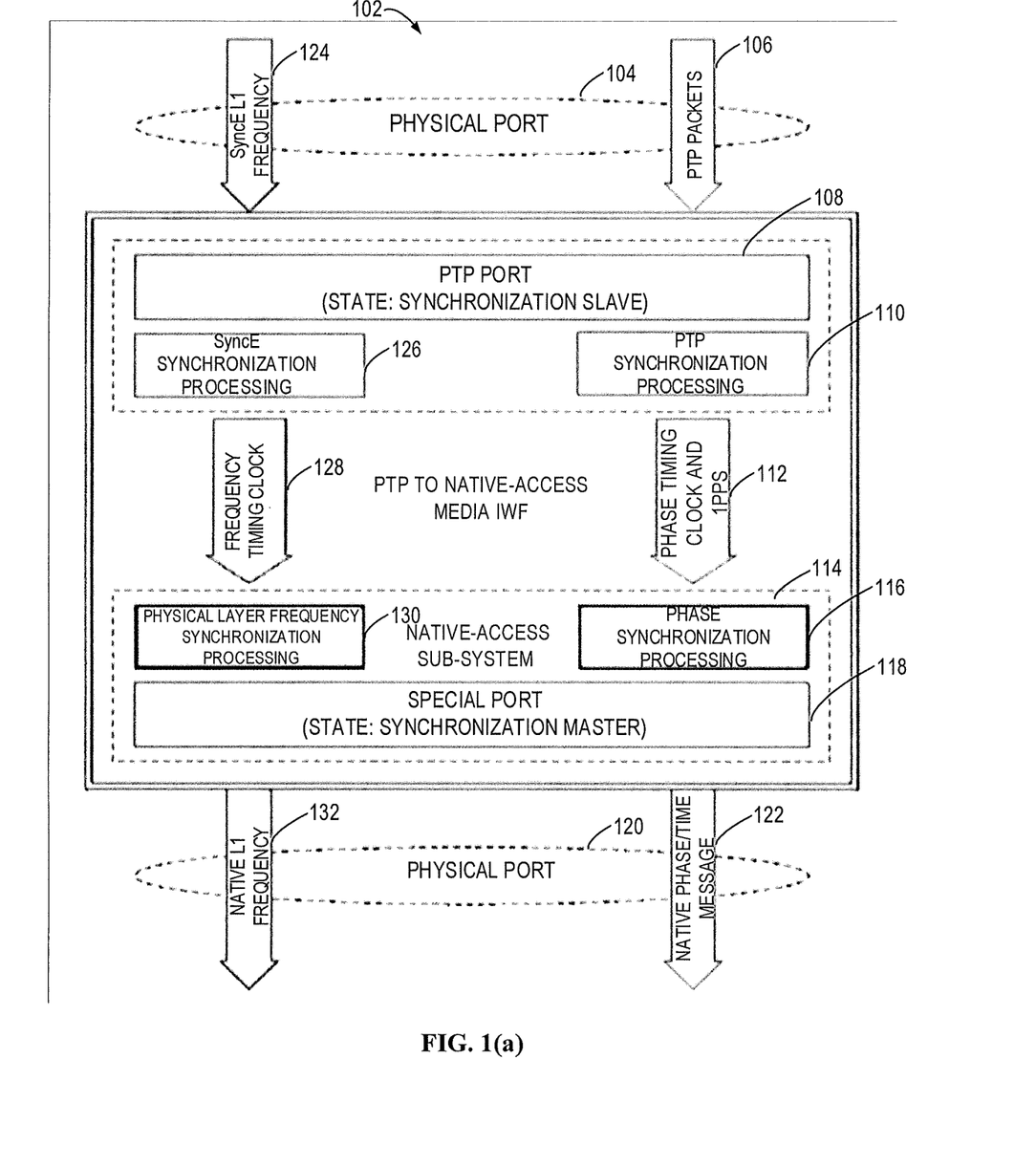
FIG. 1(a) illustrates a frequency and phase transfer process implemented at the OLT.

FIG. 1(a) illustrates a frequency and phase transfer process 102 from a PTP port to a native-access medium implemented at the OLT.

In the process 102, for the phase transfer, the OLT receives a PTP packet 106 at a physical port 104 through a PTP port 108. Subsequently, the OLT, as a synchronization slave, performs a PTP synchronization processing 110, and extracts a phase clock and 1PPS 112 by parsing the PTP packet. Then, at a native-access subsystem 114, the OLT, as a synchronization master, performs a phase synchronization processing 116, generates a native phase/time message 122, and transmits it to the downstream ONU through a special port 118 and a physical port 120.

For the frequency transfer, the OLT may receive a synchronization device (SyncE) layer 1 (L1) frequency 124 through the same physical port 104 (or a different physical port). After performing a SyncE synchronization processing 126 to extract a frequency clock 128, the OLT achieves physical layer frequency synchronization processing 130 in the native-access subsystem 114, and then transmits native L1 frequency 132 through the special port 118 and the physical port 122.

Figure 1B:
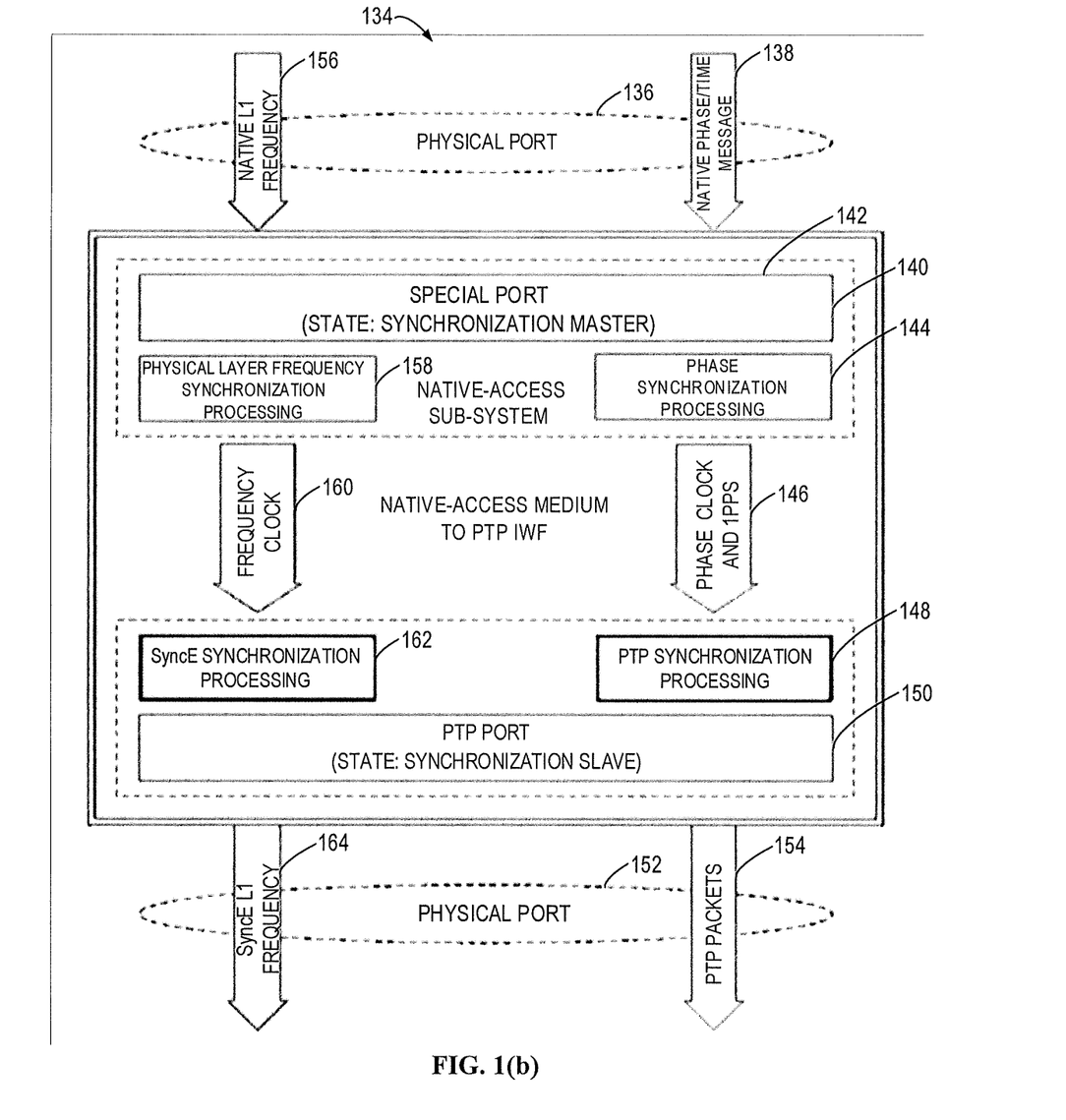
FIG. 1(b) illustrates a frequency and phase transfer process implemented at the ONU.

FIG. 1(b) illustrates a frequency and phase transfer process 134 from the native-access media to the PTP port implemented at the ONU.

In the process 134, for the phase transfer, the ONU receives a native phase/time message 138 through a physical port 136 on a special port 142 in the native-access subsystem 140. Subsequently, the ONU, as the synchronization slave, performs a phase synchronization processing 144, extracts a phase clock and 1PPS 146, and performs a PTP synchronization processing 148, thereby generating PTP synchronization information. The ONU, as the synchronization master transmits a PTP packet 154 including PTP synchronization information to a downstream node or device through a PTP port 150 and a physical port 152.

For the frequency transfer, after receipt of a native L1 frequency 156, the ONU performs a physical layer frequency synchronization processing 158, and performs a SyncE synchronization processing 162 based on the extracted frequency clock 160 to generate SyncE synchronization information. The ONU includes the SyncE synchronization information in the SyncE L1 frequency 164 and transmits it out.

In addition to the frequency and phase transfers described above, the noise transfer comprising the phase shift and frequency offset is also required to be performed between the OLT and the ONU. The current standards have already proposed performance requirements regarding the noise transfer. The following describes the noise transfer performance requirements in the xPON with reference to FIGS. 2(a), 2(b) and 2(c).

Figure 2A:
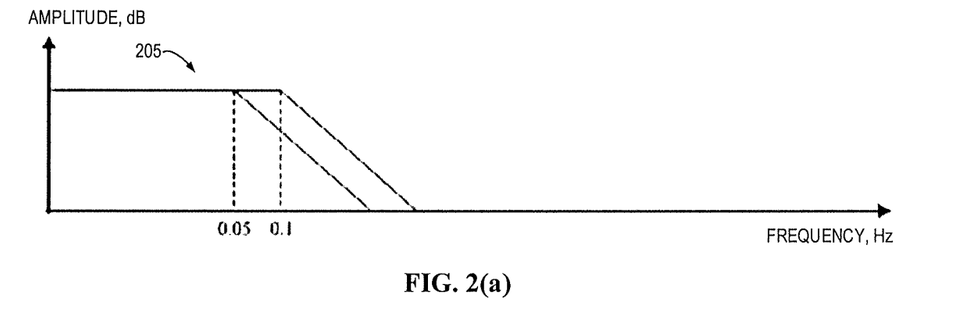
FIGS. 2(a), 2(b) and 2(c) illustrate the noise transfer performance requirements in the xPON.
Figure 2B:
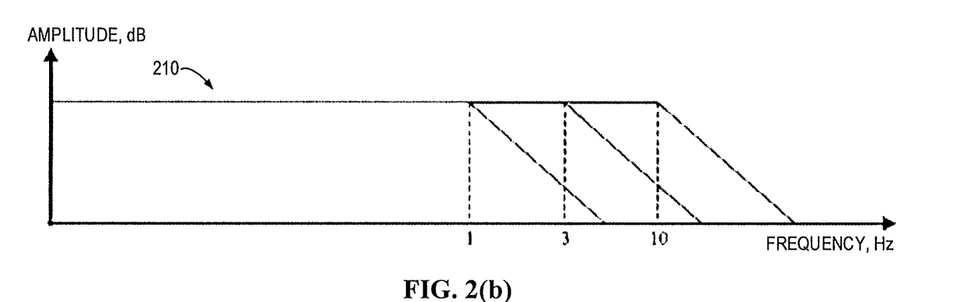
Figure 2C:
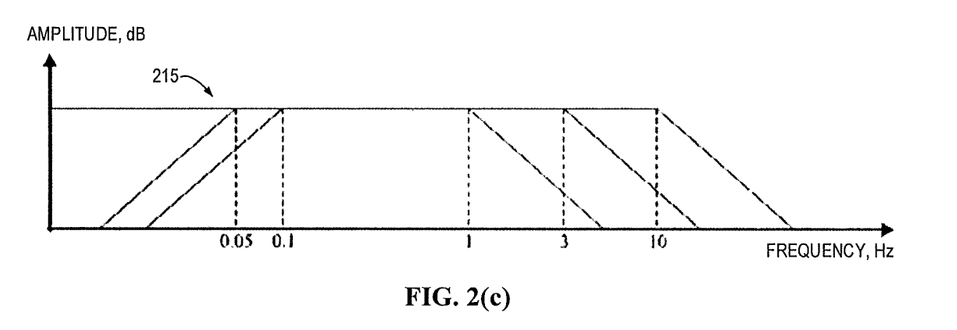

FIG. 2(a) illustrates a transfer function 205 from the PTP input port to the PTP or 1PPS output port. The function 205 describes a low-pass filtering process with a cutoff frequency of 0.05 Hz to 0.1 Hz. FIG. 2(b) illustrates a transfer function 210 from the SyncE L1 interface to the SyncE L1 interface. The function 210 also describes the low-pass filtering process with a cutoff frequency of 1 Hz to 10 Hz, for example, 1 Hz, 3 Hz, or 10 Hz. FIG. 2(c) illustrates a transfer function 215 from the SyncE L1 interface to the PTP or 1PPS output port. The function 215 describes a band-pass filtering process with an upper cutoff frequency of 1 Hz to 10 Hz and a lower cutoff frequency of 0.05 Hz to 0.1 Hz.

In WD8273.2 (TD-PLEN-0358-R1)-R1, for example, the following performance requirements are proposed for the noise transfer on the cascaded media converter acting as a TBC synchronization device:

The noise PTP-to-PTP and PTP-to-1PPS transfer of the output of the cascaded media converter equipment clock signal would have:
A maximum gain of 0.2 dB,
A maximum bandwidth of 0.1 Hz, and
A minimum gain of −6 dB for frequencies less than or equal to 0.05 Hz.

The minimum bandwidth specified for a TBC synchronization device is 0.05 Hz. If two clock signals whose 3 dB bandwidth are 0.05 Hz are cascaded, a total gain of the cascaded clock signal is −6 dB for frequencies less than or equal to 0.05 Hz. The 3 dB bandwidth of the cascaded clock signal is less than 0.05 Hz.

Due to an upstream and downstream asynchronous architecture of the xPON, the asymmetry of the upstream and downstream transmission delays leads to a complicated time synchronization process. For this reason, the xPON standard proposes to distribute time of day (ToD) information at a transmission convergence (TC) layer. For example, G.988 specifies that the ToD information in OLT-G may provide information required to achieve ToD synchronization between the reference clock of the OLT and a local clock of the ONU. As a result, the ONU determines timing relations with the OLT and performs the timing error analysis based on the ToD information.

The ToD information may include two fields, respectively denoted as (N, TstampN). The first field is a superframe count field, for example, including 4 bytes, which indicates a sequence number N of a specific GPON encapsulation mode (GEM) superframe or a GTC frame. The second field includes, for example, 10 bytes, which indicates the timestamp information TstampN, for example, as specified in clause 10.4.6 of ITU-T G. 984.3, clause 13.2 of ITU-T G. 987.3 and clause 13.2 of ITU-T G. 989.3, which utilizes the timestamp format specified in clause 5.3.3 of IEEE 1588. TstampN may indicate the exact ToD at which the first bit of the GTC frame N arrives at the ONU. The arrival of the signal at the ONU is defined to be an instant at which the signal crosses the optical connector or slice that is the boundary between the ODN and the ONU. The value 0 in all bytes of the ToD information is reserved as a null value. In addition, in ITU-T G.987 and ITU-T G.989 systems, the superframe count fields of the ToD information includes the 32 least significant bits (LSB) of an actual counter.

In the G.984.3 amd2 GPON system, since the superframe counter loops approximately every 37 hours (2.5 Gbit/s), the OLT may select a timing reference frame 37 hours in advance. It is recommended that the OLT performs this process at least once every 24 hours. A suggested delay time in the standard for the ONU to process the superframes is 10 seconds. G.9807.1 and G.989.3 suggest that the selected physical layer frame is within a 10-second window of the current time. However, the inventor noticed that if the superframe processing is completed in 10 seconds as recommended, the maximum superframe rate is only 0.1 pps, which cannot meet the noise transfer performance requirements.

The embodiments of the present disclosure provide a solution that meets requirements of noise transfer from the OLT to the ONU by adjusting a threshold rate for transmission of a time synchronization message and changing the transmission manner from the OLT to the ONU.

On the one hand, the example embodiments of the present disclosure propose a fast transmission mechanism for time synchronization information (e.g., the ToD information), so that, for example, the ToD distribution transfer in the xPON can meet the noise transfer performance requirements for the cascaded media converters. According to the mechanism, the OLT transmits a time synchronization message (e.g., a ToD message) to the ONU at a rate equal to or greater than the threshold rate. The threshold rate is N messages per second, where N is greater than or equal to 0.1. The threshold rate may be determined, for example, according to the upper cutoff frequency of the noise signal of the reference clock phase signal for generation of the time synchronization message and/or OLT-related PTP event packet rate.

In this way, the OLT can timely and effectively deliver the noise signal that changes quickly to the ONU.

On the other hand, the example embodiment of the present disclosure further proposes a multicast or broadcast transmission mechanism of time synchronization information. Based on the mechanism, the OLT concurrently transmits broadcast or multicast messages comprising time synchronization information to a plurality of ONUs. At present, in the xPON, the OLT transmits the ToD information per ONU in a unicast mode through a Management Control Interface (e.g., OMCI). However, the xPON line card of the OLT supports a plurality of PONs (e.g., 16 PONs), and each of the PONs may support a plurality of ONUs (e.g., 32 ONUs). In this case, when the OLT transmits the ToD information to each of the ONUs at a higher rate, if the ToD information is transmitted in the multicast or broadcast manner instead of the unicast manner, the transmission efficiency of the ToD information can be significantly improved and the load of the OLT can be efficiently reduced.

Figure 3:
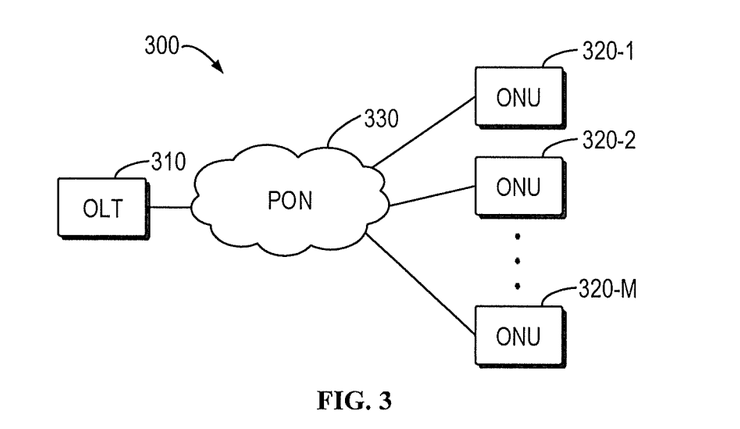
FIG. 3 illustrates an example environment in which example embodiments of the present disclosure can be implemented.

FIG. 3 illustrates an example environment 300 in which example embodiments of the present disclosure can be implemented. As shown, the environment 300 may be a part of an optical network, which includes an OLT 310 and a plurality of ONUs 320-1, 320-2 to 320-M (collectively referred to as the ONU 320), where M may be any suitable positive integer that is greater than 2. The OLT 310 and the ONU 320 communicate through a PON 330. The communication may adopt any appropriate optical communication technologies currently known or to be developed in the future.

It should be understood that, for illustrative purposes only, the OLT 310 as shown in FIG. 3 to supports one PON 330 and connects M ONUs through one PON 330. In practice, the OLT 310 can support one or more PONs, and each of the PONs may be connected to one or more ONUs.

In some example embodiments of the present disclosure, the OLT 310 can quickly transmit a time synchronization message to the ONU 320. As such, the transmitted time synchronization message can reflect changes of the noise signal more accurately, thereby ensuring that the transfer performance requirements for the noise signal can be met.

Figure 4:
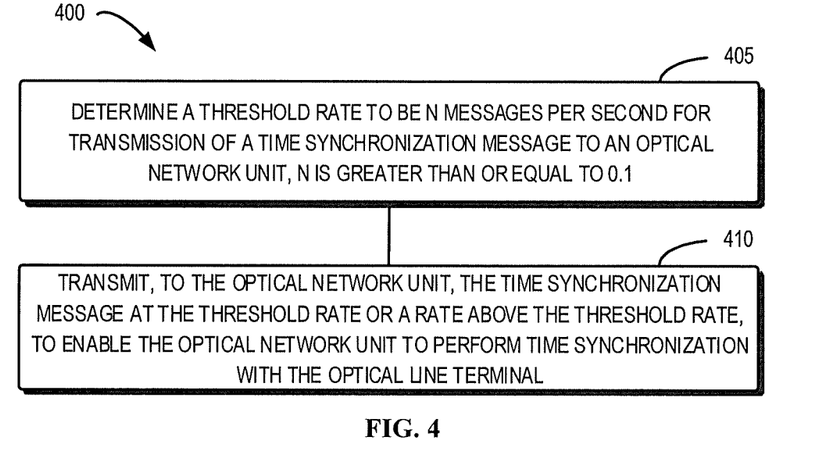
FIG. 4 illustrates a flow chart of an example method implemented at the OLT according to some example embodiments of the present disclosure.

FIG. 4 illustrates a flowchart of a method 400 implemented at the OLT according to some example embodiments of the present disclosure. The method 400 can be implemented at the OLT 310 in FIG. 3. For the convenience of discussion, the method 400 will be described below in conjunction with FIG. 3.

At block 405, the OLT 310 determines a threshold rate for transmission of the time synchronization message to the ONU 320, which is denoted as N messages per second, where N is greater than or equal to 0.1. The time synchronization message may be implemented by a message comprising any appropriate information for time synchronization, for example, a ToD message comprising the ToD information, such as an OMCI message.

The OLT 310 may consider any appropriate factors in determining the threshold rate. In some example embodiments, the requirements of noise transfer performance may be taken into consideration. For example, the threshold rate may be determined based on the upper cutoff frequency of the noise signal of the reference clock phase signal for generation of the time synchronization message. The reference clock phase signal may be received by the OLT 310 from an upstream device, and maybe from a global or local clock source.

As an example, in a case where the noise comes from a PTP packet comprising a phase signal, considering that a passband cutoff frequency as shown in FIG. 2(a) is 0.05 Hz~0.1 Hz, according to the sampling theorem (also known as the Nyquist Theorem), in the process of analog/digital signal conversion, when the sampling frequency is 2 times greater than the highest frequency in the signal, the digital signal after sampling completely retains the information in the original signal. In general practical applications, the sampling frequency is guaranteed to be 2.56 to 4 times the highest frequency of the signal. On this basis, the threshold rate N may be determined as:

$$N=0.1\times4=0.4 \text{ pps} \tag{1}$$

In the case of using superframes for transmission of the ToD information, the threshold rate N is 0.4 superframes per second.

In a case where the noise comes from the frequency signal SyncE, considering that the upper cutoff frequency of the passband as shown in FIG. 2(c) is 1 Hz to 10 Hz, if the sampling rate of 4 times is also used, the threshold rate N may be determined as :

$$N=10\times4=40 \text{ pps} \tag{2}$$

In the case of using superframes for transmission of the ToD information, the threshold rate N is 40 superframes per second. In order to satisfy the noise transfer of phase and frequency simultaneously, the threshold rate N should be 40 superframes per second on the basis of 4 times the sampling rate.

It should be understood that the 4 times the sampling rate is only an example and not a limitation. In practice, any appropriate sampling rate that satisfies the Nyquist sampling theorem can be utilized. Certainly, the higher the sampling rate, the higher the noise transfer accuracy is.

Additionally or alternatively, for simplicity, the ToD transmission between the OLT and the ONU is similar to the PTP packet transmission between two TBC nodes, and the OLT 310 may determine the threshold rate N for transmission of the time synchronization message based on the rate for receiving PTP event packets. For example, the PTP event packets rate is defined to be 16 per second in the G.8275.1 standard. Accordingly, the threshold rate N of the ToD message may be set to be 16 pps.

After determining the threshold rate N, at block 410, the OLT 310 transmits, to the ONU 320, the time synchronization message at the threshold rate N or a rate above the threshold rate N, to enable the ONU 320 to perform time synchronization with the OLT 310. For example, in a case where the threshold rate N is determined to be 16 pps, the OLT 310 may transmit, to the ONU 320, the time synchronization message at a rate of 16 pps or a rate higher than 16 pps. Accordingly, the ONU 320 may need to complete the superframe processing in ¹⁄₁₆ of a second or a period less than ¹⁄₁₆ of a second.

According to some other example embodiments of the present disclosure, the time synchronization information of all the ONUs synchronized with the same clock source is the same. For example, (N, TstampN) of the ToD information are the same, and the OLT 310 is enabled to transmit the time synchronization message comprising ToD information to a plurality of ONUs 320-1, 320-2 to 320-M in a multicast or broadcast manner. In this way, a plurality of ONUs 320-1, 320-2 to 320-M can perform time synchronization with the OLT 310 based on the ToD information.

Figure 5:
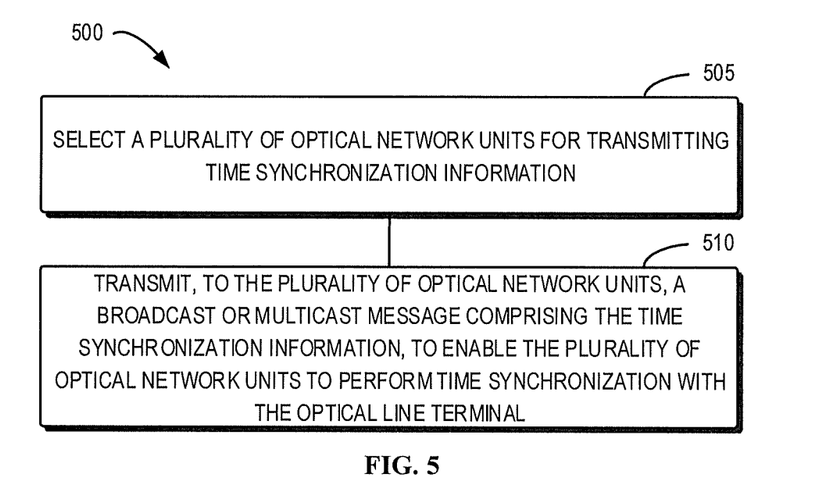
FIG. 5 illustrates a flow chart of an example method implemented at the OLT according to some other example embodiments of the present disclosure.

FIG. 5 illustrates a flow chart of a method 500 implemented at the OLT according to some other example embodiments of the present disclosure. The method 500 can be implemented at the OLT 310 in FIG. 3. For the convenience of discussion, the method 500 will be described below with reference to FIG. 3.

At block 505, the OLT 310 selects a plurality of ONUs, such as a plurality of ONUs 320-1, 320-2 to 320-M communicating through the PON 330, for transmitting time synchronization information, such as the ToD information. In the case that the OLT 310 controls a plurality of PONs, the OLT 310 may select more ONUs connected to the plurality of PONs to transmit the ToD information.

At block 510, the OLT 310 transmits, to the plurality of ONUs 320-1, 320-2 to 320-M, a broadcast or multicast message comprising the time synchronization information, so that the plurality of ONUs 320-1, 320-2 to 320-M is enabled to perform time synchronization with the OLT 310. For example, if all the ONUs 320 communicating with the OLT 310 are synchronized with the same clock source, the OLT 310 may transmit the time synchronization information to these ONUs 320 in a broadcast manner. If these ONUs need to be synchronized with a plurality of clock sources, and the ONU 320-1, 320-2 to 320-M are synchronized with one of the clock sources, the OLT 310 may transmit time synchronization information to the ONUs 320-1, 320-2 to 320-M in a multicast manner. At the same time, the OLT 310 transmits time synchronization information for synchronization with other clock sources to a further plurality of ONUs in a multicast manner.

The multicast or broadcast message may be implemented by any suitable multicast or broadcast message supported in the optical network. In some example embodiments, a multicast or broadcast OMCI message may be used for carrying the time synchronization information. In some example embodiments, a multicast or broadcast Physical Layer Operations, Administration and Maintenance (PLOAM) message may be used. Since the PLOAM message does not need to be transferred through cloud services, using the multicast or broadcast PLOAM message to transmit time synchronization information may further improve the transmission speed and efficiency of the time synchronization information.

In some example embodiments, the broadcast or multicast message may include a group identifier for identifying the plurality of ONUs 320-1, 320-2 to 320-M, to enable each of the ONU 320-1, 320-M 2 to 320-M to receive according to the group identifier.

Table 1 below shows an example structure of a broadcast/multicast PLOAM message.

TABLE 1

| Octet | Content | Descriptions |
| --- | --- | --- |
| 1-2 | ONU-ID | 0x03FF, Broadcast ONU-ID. |
| 3 | Message type ID | 0xxx, "PLOAM message name". |
| 4-7 | Superframe ID | the sequence number of the specified GEM superframe. |
| 8-17 | The timestamp of Superframe | TstampN as defined in clause 10.4.6 of [ITU-T G.984.3], clause C 13.2 of [ITU-T G.9807.1] and clause 13.2 of [ITU-T G.989.3], using the timestamp format of clause 5.3.3 of [IEEE 1588]. |
| 18-40 | Padding | Set to 0x00 by the transmitter; treated as "don't care" by the receiver. |
| 41-48 | MIC | Message integrity check (MIC), computed using the default PLOAM integrity key. |

In this example, the ONU identification (ONU-ID) is the group identifier for identifying a plurality of ONUs.

An example structure of a broadcast/multicast OMCI message is shown as follows.

Figure 6:
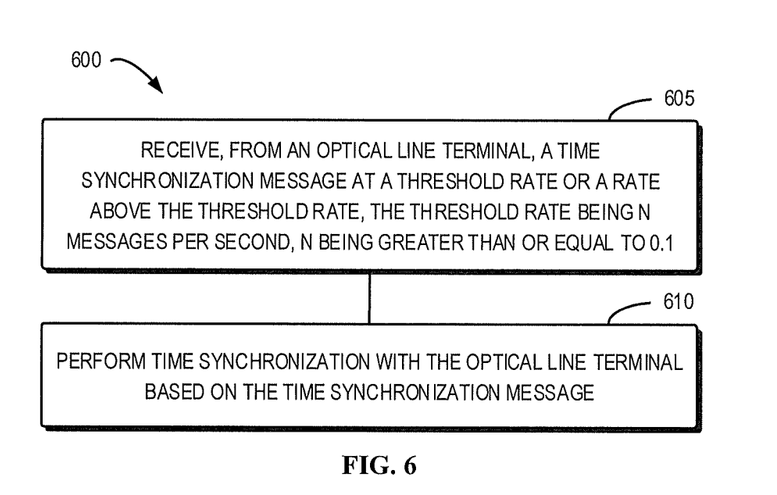
FIG. 6 illustrates a flow chart of an example method implemented at the ONU according to some example embodiments of the present disclosure.

ToD message
    This message (ME) provides a way for the OLT to transmit the ToD information to the ONU.
    The ONU that supports this ME automatically creates an instance. After the startup phase, the OLT should periodically set the ONU to a desired value.
Association
    A single instance of this ME is associated with a broadcast/multicast Gem port ID.
Attributes
    Managed entity ID: This attribute uniquely identifies each instance of this ME. There is only one instance, numbered 0, (R) (mandatory) (2 bytes).
ToD information: This attribute provides information required to achieve ToD synchronization between the reference clock on the OLT and the local clock on the ONU. This attribute includes two fields: the first field (4 bytes) is the sequence number of the specified GEM superframe. The second field (10 bytes) is TstampN, as defined in clause 10.4.6 of ITU-T G.984.3, clause 13.2 of ITU-T G.987.3 and clause 13.2 of ITU-T G.989.3, which utilizes the timestamp format as specified in clause 5.3.3 of IEEE 1588. The value 0 in all the bytes is reserved as a null value. (R, W) (optional) (14 bytes).
Note: In the ITU-T G.987/ITU-T G.989 system, the superframe count field of the ToD information attribute includes 32 LSBs of the actual counter.
Action
    obtain, set
Notice
    None FIG. 6 illustrates a flow chart of a method 600 implemented at the ONU according to some example embodiments of the present disclosure. The method 600 can be implemented at the ONU 320 in FIG. 3. For the convenience of discussion, the method 600 will be described below in conjunction with FIG. 3.

At block 605, the ONU 320 receives, from the OLT 310, the time synchronization message at a threshold rate or a rate above the threshold rate. The threshold rate is N messages per second, where N is greater than or equal to 0.1. At block 610, the ONU 320 performs time synchronization with the OLT 310 based on the time synchronization message.

In some example embodiments, the time synchronization message may be generated by the OLT 310 based on the reference clock phase signal. The threshold rate may be associated with the upper cutoff frequency of the noise signal of the reference clock phase signal. In the exemplary embodiment where the reference clock phase signal is transmitted via the PTP packet, the threshold rate may be associated with the rate at which the optical line terminal receives the PTP event packet.

In some embodiments, the ONU 320 completes the processing of the received time synchronization message in 1/N of a second or a period less than 1/N of a second.

Figure 7:
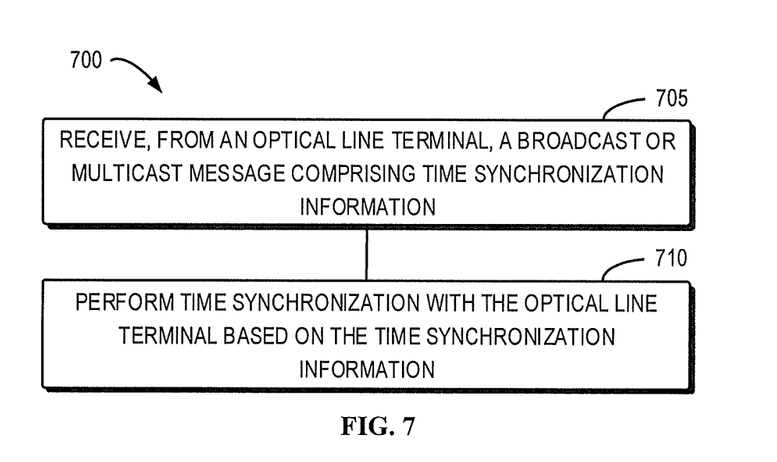
FIG. 7 illustrates a flow chart of an example method implemented at the ONU according to some other example embodiments of the present disclosure.

FIG. 7 illustrates a flow chart of a method 700 implemented at the ONU according to some other example embodiments of the present disclosure. The method 700 can be implemented at the ONU 320 in FIG. 7. For the convenience of discussion, the method 700 will be described below in conjunction with FIG. 3.

At block 705, the ONU 320 receives, from OLT 310, a broadcast or multicast message comprising time synchronization information. At block 710, the ONU 320 performs time synchronization with the OLT 310 based on the time synchronization information.

In some example embodiments, the broadcast or multicast message may include at least one of a PLOAM message and an OMCI message. In some example embodiments, the broadcast or multicast message may include a group identifier for identifying the plurality of ONUs 320.

It should be understood that the operations and features involved in the methods 400 and 500 implemented at the OLT described above in conjunction with FIGS. 3 to 5 are also applicable to the methods 600 and 700 implemented at the ONU, and achieve the same effects, and thus the specific details will not be repeated.

Figure 8:
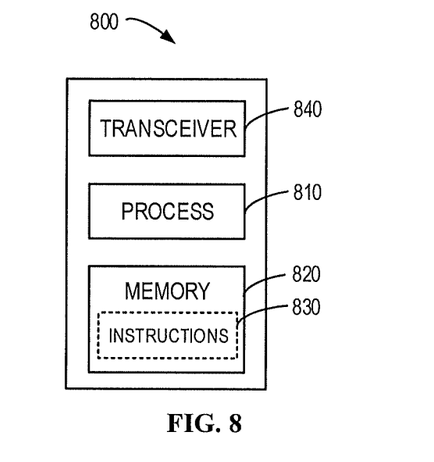
FIG. 8 illustrates a block diagram of a device that can be used to implement some example embodiments of the present disclosure.

FIG. 8 illustrates a block diagram of a device 800 that is suitable for implementing some example embodiments of the present disclosure. The device 800 can be used to implement, for example, the OLT 310 or the ONU 320 shown in FIG. 3.

As shown, the device 800 includes a processor 810. The processor 810 controls operations and functions of the device 800. For example, in some example embodiments, the processor 810 may perform various operations by means of instructions 830 stored in the memory 820 coupled thereto. The memory 820 may be of any suitable type suitable for the local technical environment, and may be implemented using any suitable data storage technology, including but not limited to, a semiconductor-based storage device, a magnetic storage device and system, and an optical storage device and system. Although only one memory unit is shown in FIG. 8, there may be multiple physically different memory units in the device 800.

The processor 810 may be of any suitable type suitable for the local technical environment, and may include, but is not limited to, general-purpose computers, special-purpose computers, microcontrollers, digital signal controllers (DSP), and one or more of controller-based multi-core controller architectures. The device 800 may also include multiple processors 810. The processor 810 is coupled to the transceiver 840 which may receive and send information by means of optical fibers, cables, and/or other components.

In a case where the device 800 acts as the OLT 310, the processor 810 may implement the methods 400 and 500 described above with reference to FIGS. 3 to 5 by executing instructions. In a case where the device 800 acts as the ONU 320, the processor 810 may implement the methods 600 and 700 described above with reference to FIGS. 6 and 7 by executing instructions. All the features described above with reference to FIG. 1 to FIG. 7 are applicable to the device 800 and will not be repeated herein.

Generally, various example embodiments of the present disclosure may be implemented in hardware or special purpose circuits, software, logic, or any combination thereof. Some aspects may be implemented in hardware, while other aspects may be implemented in firmware or software that may be executed by a controller, microprocessor, or other computing devices. While the various aspects of the example embodiments of the present disclosure are illustrated and described as block diagrams, flowcharts, or using some other graphical representation, it is to be understood that the blocks, apparatuses, systems, techniques, or methods described herein can be regarded as non-limiting examples implemented in hardware, software, firmware, special purpose circuits or logic, general-purpose hardware or controllers or other computing devices, or some combination thereof.

As an example, the example embodiments of the present disclosure may be described in the context of machine-executable instructions, such as those included in program modules, being executed in a device on a target real or virtual processor. Generally, program modules include routines, programs, libraries, objects, classes, components, data structures, and etc., which perform particular tasks or implement specific abstract data types. In various example embodiments, the functionality of the program modules may be combined or split between the described program modules. The machine-executable instructions for the program modules may be executed within a local or distributed device. In a distributed device, program modules may be located in both local and remote storage media.

The computer program codes for carrying out the methods of the present disclosure may be written in one or more programming languages. The computer program codes may be provided to a processor of a general purpose computer, a special purpose computer or other programmable data processing apparatus such that the program codes, when executed by the computer or other programmable data processing apparatus, cause the functions/operations specified in flowcharts and/or block diagrams to be implemented. The program codes may be executed entirely on a computer, partly on the computer, as a stand-alone software package, partly on the computer and partly on a remote computer or entirely on the remote computer or server.

In the context of the present disclosure, a machine-readable medium may be any tangible medium that includes or stores a program for use with or in connection with an instruction execution system, apparatus, or device. The computer-readable medium may be a machine-readable signal medium or a machine-readable storage medium. The computer-readable medium may include, but is not limited to, an electronic, magnetic, optical, electromagnetic, infrared, or semiconductor system, apparatus, or device, or any suitable combination of the foregoing. More specific examples of the computer-readable storage media would include electrical connections having one or more wires, a portable computer diskette, a hard disk, a random access memory (RAM), a read only memory (ROM), an erasable programmable read-only memory (EPROM or flash memory), an optical storage device, a magnetic storage device, or any suitable combination of the foregoing.

Further, although the operations are depicted in a particular order, this should not be understood as requiring such operations to be performed in the particular order shown or in sequential order, or that all illustrated operations be performed, to achieve desired results. In certain circumstances, multitasking or parallel processing may be advantageous. Likewise, while certain specific implementation details are contained in the foregoing discussion, these should not be construed as limitations on the scope of any invention or claims, but rather as descriptions of particular example embodiments that can be specific to particular inventions. Certain features that are described in the context of separate example embodiments in this description may also be implemented in combination in a single example embodiment. Conversely, various features that are described in the context of a single example embodiment may also be implemented in multiple example embodiments separately or in any suitable sub-combination.

Although the present disclosure has been described in language specific to structural features and/or methodological actions, it should be understood that the present disclosure defined in the appended claims is not necessarily limited to the specific features or acts described above.

Rather, the specific features and acts described above are disclosed as example forms for implementing the claims.

Various example embodiments of the present disclosure have been described. In addition to or alternative to the above, the following examples are described. The functions described in any of the following examples may be used with any of the other examples described herein.

In some aspects, the optical line terminal, comprising: at least one processor, and at least one memory having computer program codes stored thereon, the at least one memory and the computer program codes are configured to, with the at least one processor, cause the optical line terminal to: determine a threshold rate to be N messages per second for transmission of a time synchronization message to an optical network unit, N being greater than or equal to 0.1; and transmitting, to the optical network unit, the time synchronization message at the threshold rate or a rate above the threshold rate, to enable the optical network unit to perform time synchronization with the optical line terminal.

In some example embodiments, the optical line terminal is further caused to: receive a reference clock phase signal for generation of the time synchronization message.

In some example embodiments, the optical line terminal is caused to determine the threshold rate by: determining the threshold rate for the transmission of the time synchronization message based on an upper cutoff frequency of a noise signal of the reference clock phase signal.

In some example embodiments, the reference clock phase signal is transmitted via a PTP packet, and the optical line terminal is caused to determine the threshold rate by: determining the threshold rate for the transmission of the time synchronization message based on a rate at which the optical line terminal receives a PTP event packet.

In some example embodiments, the time synchronization message comprises ToD information.

In some aspects, there is provided an optical network unit, comprising: at least one processor, and at least one memory having computer program codes stored thereon, the at least one memory and the computer program codes are configured to, with the at least one processor, cause the optical network unit to: receive, from an optical line terminal, a time synchronization message at a threshold rate or a rate above the threshold rate, the threshold rate being N messages per second, N being an integer greater than or equal to 1; and perform time synchronization with the optical line terminal based on the time synchronization message.

In some example embodiments, the time synchronization message is generated by the optical line terminal based on a reference clock phase signal.

In some example embodiments, the threshold rate is associated with an upper cutoff frequency of a noise signal of the reference clock phase signal.

In some example embodiments, the reference clock phase signal is transmitted via a PTP packet, and the threshold rate is associated with a rate at which the optical line terminal receives a PTP event packet.

In some example embodiments, the time synchronization message comprises ToD information.

In some example embodiments, the optical network unit is further caused to: complete processing of the received time synchronization message in 1/N of a second or a period less than 1/N of a second.

In some aspects, there is provided an optical line terminal, comprising: at least one processor, and at least one memory having computer program codes stored thereon, the at least one memory and the computer program codes are configured to, with the at least one processor, cause the optical line terminal to: select a plurality of optical network units for transmitting time synchronization information; and transmitting, to the plurality of optical network units, a broadcast or multicast message comprising the time synchronization information, to enable the plurality of optical network units to perform time synchronization with the optical line terminal.

In some example embodiments, the broadcast or multicast message comprises at least one of a PLOAM message and an optical network unit OMCI message.

In some example embodiments, the broadcast or multicast message comprises a group identifier for identifying the plurality of optical network units.

In some example embodiments, the time synchronization information includes ToD information.

In some aspects, there is provided an optical network unit, comprising: at least one processor, and at least one memory having computer program codes stored thereon, the at least one memory and the computer program codes are configured to, with the at least one processor, cause the optical network unit to: receive, from an optical line terminal, a broadcast or multicast message comprising time synchronization information; and perform time synchronization with the optical line terminal based on the time synchronization information.

In some example embodiments, the broadcast or multicast message comprises at least one of a PLOAM message and an optical network unit OMCI message.

In some example embodiments, the broadcast or multicast message comprises a group identifier for identifying the plurality of optical network units.

In some example embodiments, the time synchronization information comprises ToD information.

In some aspects, the method implemented at an optical line terminal, comprises: determining a threshold rate to be N messages per second for transmission of a time synchronization message to an optical network unit, N being greater than or equal to 0.1; and transmitting, to the optical network unit, the time synchronization message at the threshold rate or a rate above the threshold rate, to enable the optical network unit to perform time synchronization with the optical line terminal.

In some example embodiments, the method further comprises: receiving a reference clock phase signal for generation of the time synchronization message.

In some example embodiments, determining the threshold rate comprises:

determining the threshold rate for the transmission of the time synchronization message based on an upper cutoff frequency of a noise signal of the reference clock phase signal.

In some example embodiments, the reference clock phase signal is transmitted via a PTP packet, and determining the threshold rate comprises: determining the threshold rate for the transmission of the time synchronization message based on a rate at which the optical line terminal receives a PTP event packet.

In some example embodiments, the time synchronization message comprises ToD information.

In some example embodiments, there is provided a method implemented at an optical network unit, comprising: receiving, from an optical line terminal, a time synchronization message at a threshold rate or a rate above the threshold rate, the threshold rate being N messages per second, N being greater than or equal to 0.1; and performing time synchronization with the optical line terminal based on the time synchronization message.

In some example embodiments, the time synchronization message is generated by the optical line terminal based on a reference clock phase signal.

In some example embodiments, the threshold rate is associated with an upper cutoff frequency of a noise signal of the reference clock phase signal.

In some example embodiments, the reference clock phase signal is transmitted via a PTP packet, and the threshold rate is associated with a rate at which the optical line terminal receives a PTP event packet.

In some example embodiments, the time synchronization message comprises ToD information.

In some example embodiments, the method further comprises: completing processing of the received time synchronization message in 1/N of a second or a period less than 1/N of a second.

In some aspects, there is provided a method implemented at an optical line terminal, comprising: selecting a plurality of optical network units for transmitting time synchronization information; and transmitting, to the plurality of optical network units, a broadcast or multicast message comprising the time synchronization information, to enable the plurality of optical network units to perform time synchronization with the optical line terminal.

In some example embodiments, the broadcast or multicast message comprises at least one of a PLOAM message and an optical network unit OMCI message.

In some example embodiments, the broadcast or multicast message comprises a group identifier for identifying the plurality of optical network units.

In some example embodiments, the time synchronization information comprises ToD information.

In some aspects, there is provided a method implemented at an optical network unit, comprising: receiving, from an optical line terminal, a broadcast or multicast message comprising time synchronization information; and performing time synchronization with the optical line terminal based on the time synchronization information.

In some example embodiments, the broadcast or multicast message comprises at least one of a PLOAM message and an optical network unit OMCI message.

In some example embodiments, the broadcast or multicast message comprises a group identifier for identifying the plurality of optical network units.

In some example embodiments, the time synchronization information comprises ToD information.

In some example embodiments, there is provided an apparatus, comprising: means for determining a threshold rate to be N messages per second for transmission of a time synchronization message to an optical network unit, N being greater than or equal to 0.1; and means for transmitting, to the optical network unit, the time synchronization message at the threshold rate or a rate above the threshold rate, to enable the optical network unit to perform time synchronization with the optical line terminal.

In some example embodiments, the apparatus further comprises: means for receiving a reference clock phase signal for generation of the time synchronization message.

In some example embodiments, the means for determining the threshold rate comprises: means for determining the threshold rate for the transmission of the time synchronization message based on an upper cutoff frequency of a noise signal of the reference clock phase signal.

In some example embodiments, the reference clock phase signal is transmitted via a PTP packet, and the means for determining the threshold rate comprises: means for determining the threshold rate for the transmission of the time synchronization message based on a rate at which the optical line terminal receives a PTP event packet.

In some example embodiments, the time synchronization message comprises ToD information.

In some aspects, there is provided an apparatus, comprising: means for receiving, from an optical line terminal, a time synchronization message at a threshold rate or a rate above the threshold rate, the threshold rate being N messages per second, N being greater than or equal to 0.1; and means for performing time synchronization with the optical line terminal based on the time synchronization message.

In some example embodiments, the time synchronization message is generated by the optical line terminal based on a reference clock phase signal.

In some example embodiments, the threshold rate is associated with an upper cutoff frequency of a noise signal of the reference clock phase signal.

In some example embodiments, the reference clock phase signal is transmitted via a PTP packet, and the threshold rate is associated with a rate at which the optical line terminal receives a PTP event packet.

In some example embodiments, the time synchronization message comprises ToD information.

In some example embodiments, there is provided an apparatus, comprising: means for selecting a plurality of optical network units for transmitting time synchronization information; and means for transmitting, to the plurality of optical network units, a broadcast or multicast message comprising the time synchronization information, to enable the plurality of optical network units to perform time synchronization with the optical line terminal.

In some example embodiments, the broadcast or multicast message comprises at least one of a PLOAM message and an optical network unit OMCI message.

In some example embodiments, the broadcast or multicast message comprises a group identifier for identifying the plurality of optical network units.

In some example embodiments, the time synchronization information comprises ToD information.

In some aspects, there is provide an apparatus, comprising: means for receiving, from an optical line terminal, a broadcast or multicast message comprising time synchronization information; and means for performing time synchronization with the optical line terminal based on the time synchronization information.

In some example embodiments, the broadcast or multicast message comprises at least one of a PLOAM message and an optical network unit OMCI message.

In some example embodiments, the broadcast or multicast message comprises a group identifier for identifying the plurality of optical network units.

In some example embodiments, the time synchronization information comprises ToD information.

In some aspects, there is provided a computer-readable storage medium having program instructions stored thereon, the instructions, when executed by a processor on a device, cause the device to perform the method of some example embodiments of the present disclosure.

We claim:

1. An optical line terminal, comprising:
   at least one processor, and
   at least one non-transitory memory having computer program codes stored thereon,
   the at least one memory and the computer program codes are configured to, with the at least one processor, cause the optical line terminal to:

determine a threshold rate to be N messages per second for transmission of a time synchronization message to an optical network unit, N being greater than or equal to 0.1 pulses per second, wherein the time synchronization message comprises time of day information; and transmit, to the optical network unit, the time synchronization message at the threshold rate or a rate above the threshold rate, to enable the optical network unit to perform time synchronization with the optical line terminal.

2. The optical line terminal of claim 1, wherein the optical line terminal is further caused to:

receive a reference clock phase signal for generation of the time synchronization message.

3. The optical line terminal of claim 2, wherein the optical line terminal is caused to determine the threshold rate with:

determining the threshold rate for the transmission of the time synchronization message based on an upper cutoff frequency of a noise signal of the reference clock phase signal.

4. The optical line terminal of claim 2, wherein the reference clock phase signal is transmitted via a precision time protocol packet, and the optical line terminal is caused to determine the threshold rate with:

determining the threshold rate for the transmission of the time synchronization message based on a rate, the optical line terminal receiving a precision time protocol event packet at the rate.

5. An optical network unit, comprising:

at least one processor, and at least one non-transitory memory having computer program codes stored thereon, the at least one memory and the computer program codes are configured to, with the at least one processor, cause the optical network unit to:

receive, from an optical line terminal, a time synchronization message at a threshold rate or a rate above the threshold rate, the threshold rate being N messages per second, N being greater than or equal to 0.1 pulses per second, wherein the time synchronization message comprises time of day information; and perform time synchronization with the optical line terminal based on the time synchronization message.

6. The optical network unit of claim 5, wherein the time synchronization message is generated by the optical line terminal based on a reference clock phase signal.

7. The optical network unit of claim 6, wherein the threshold rate is associated with an upper cutoff frequency of a noise signal of the reference clock phase signal.

8. The optical network unit of claim 6, wherein the reference clock phase signal is transmitted via a precision time protocol packet, and the threshold rate is associated with a rate, the optical line terminal receiving a precision time protocol event packet at the rate.

9. The optical network unit of claim 5, wherein the optical network unit is further caused to:

complete processing of the received time synchronization message in 1/N of a second or a period less than 1/N of a second.

10. An optical line terminal, comprising:

at least one processor, and at least one non-transitory memory having computer program codes stored thereon, the at least one memory and the computer program codes are configured to, with the at least one processor, cause the optical line terminal to:

select a plurality of optical network units for transmitting time synchronization information;

transmit, to the plurality of optical network units, a broadcast or multicast message comprising the time synchronization information at a threshold rate or a rate above the threshold rate, the threshold rate being N messages per second, N being greater than or equal to 0.1 pulses per second, to enable the plurality of optical network units to perform time synchronization with the optical line terminal, wherein the time synchronization information comprises time of day information.

11. The optical line terminal of claim 10, wherein the broadcast or multicast message comprises at least one of:

a physical layer operations, administration and maintenance message, or an optical network unit management and control interface message.

12. The optical line terminal of claim 10, wherein the broadcast or multicast message comprises a group identifier for identifying the plurality of optical network units.

13. An optical network unit, comprising:

at least one processor, and at least one non-transitory memory having computer program codes stored thereon, the at least one memory and the computer program codes are configured to, with the at least one processor, cause the optical network unit to:

receive, from an optical line terminal, a broadcast or multicast message comprising time synchronization information at a threshold rate or a rate above the threshold rate, the threshold rate being N messages per second, N being greater than or equal to 0.1 pulses per second, wherein the time synchronization information comprises time of day information; and perform time synchronization with the optical line terminal based on the time synchronization information.

14. The optical network unit of claim 13, wherein the broadcast or multicast message comprises at least one of:

a physical layer operations, administration and maintenance message, or an optical network unit management and control interface message.

15. The optical network unit of claim 13, wherein the broadcast or multicast message comprises a group identifier for identifying a plurality of optical network units.

* * * * *